J. H. McCORMICK.
COTTON SEED DELINTER.
APPLICATION FILED FEB. 28, 1911.
1,020,108.
Patented Mar. 12, 1912.
3 SHEETS—SHEET 2.
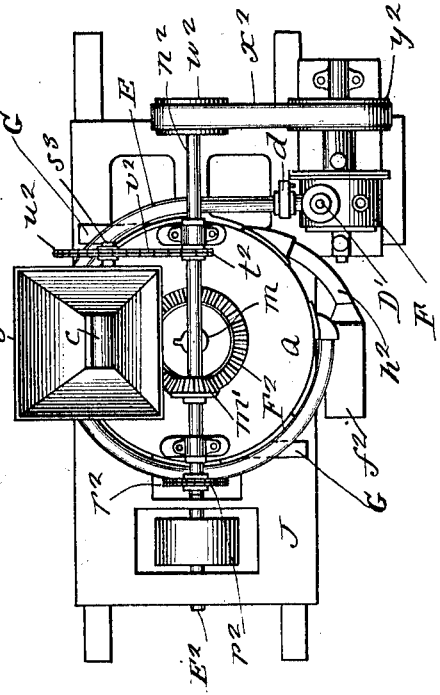
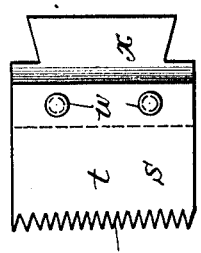
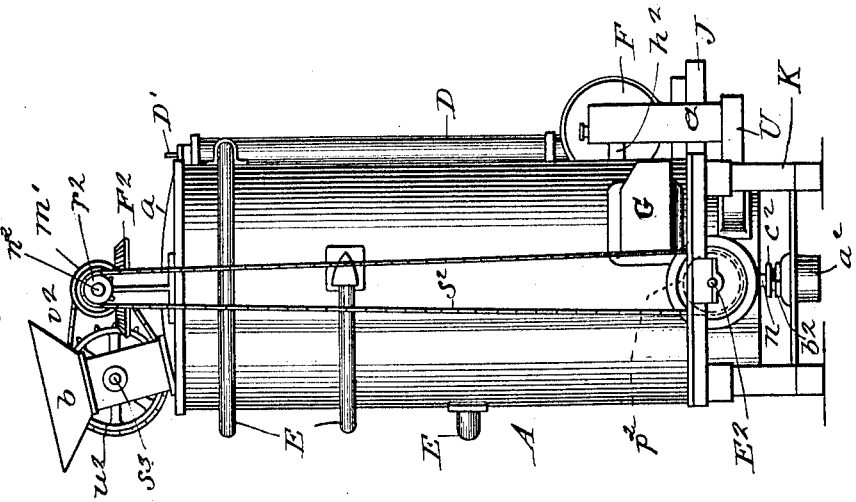
WITNESSES
Philip E. Barnes
W. C. Healy
INVENTOR
J. H. McCormick.
By James Sheehy & Co. Attorney J. H. McCORMICK.
COTTON SEED DELINTER.
APPLICATION FILED FEB. 28, 1911.
1,020,108.
Patented Mar. 12, 1912.
3 SHEETS—SHEET 3.
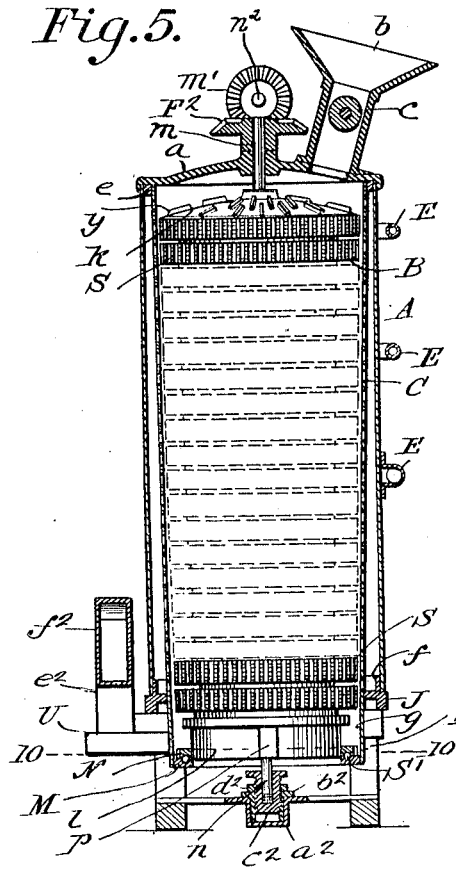
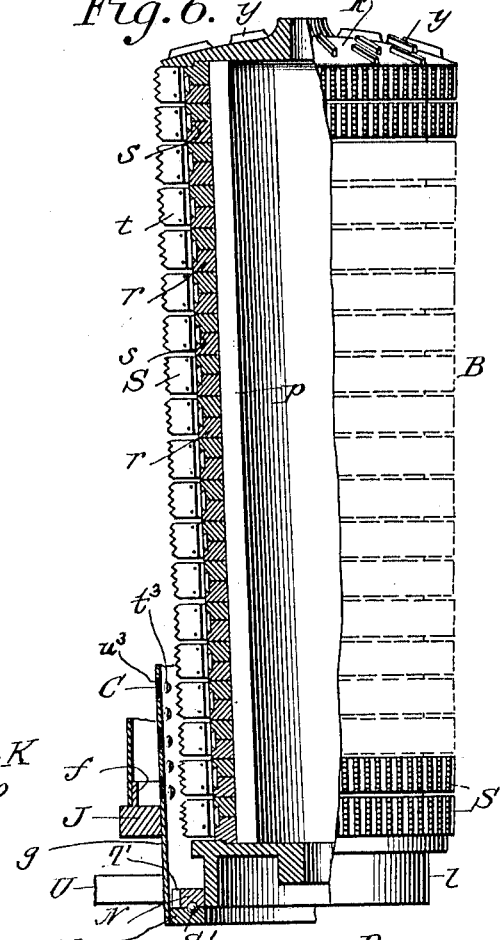
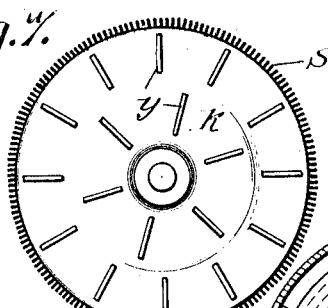
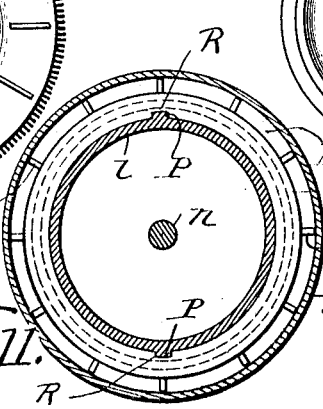
WITNESSES
INVENTOR

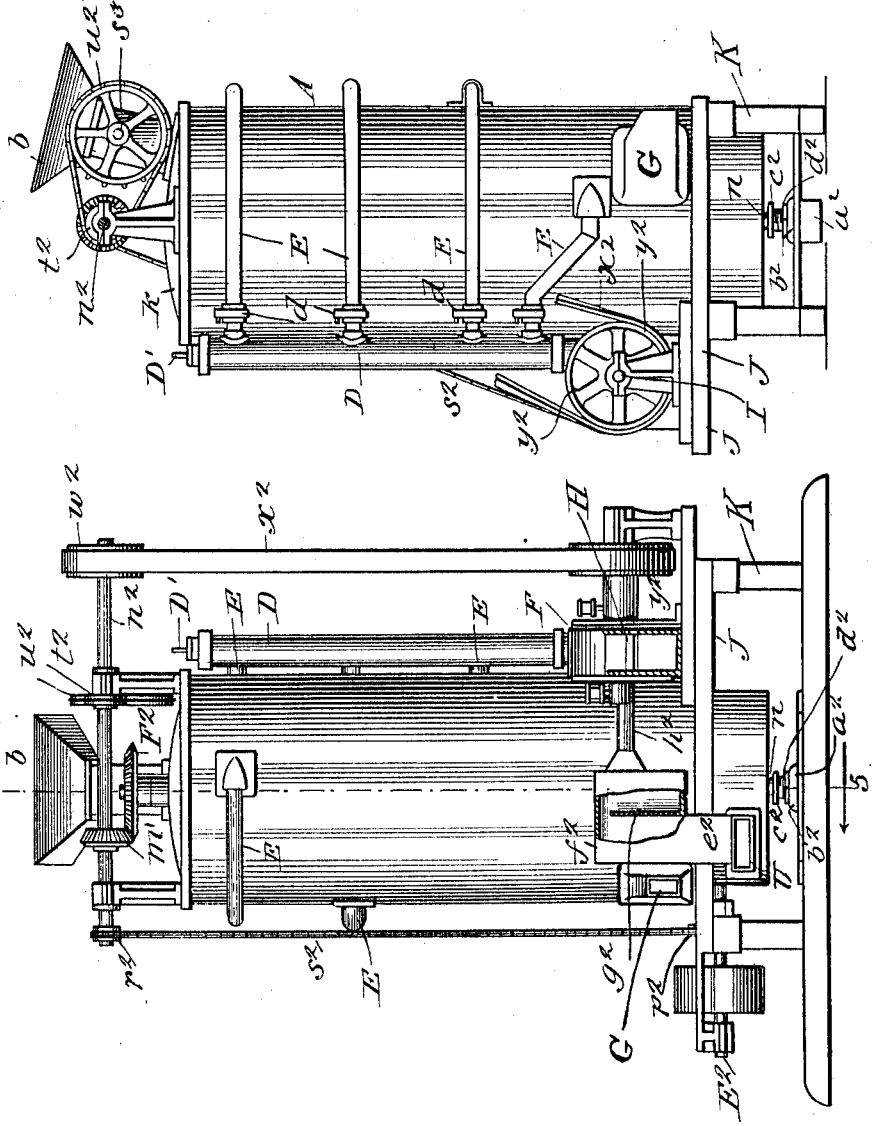

UNITED STATES PATENT OFFICE.

JOHN HOWARD McCORMICK, OF NEW ORLEANS, LOUISIANA.

COTTON-SEED DELINTER.

1,020,108.  Specification of Letters Patent.  Patented Mar. 12, 1912.

Application filed February 28, 1911. Serial No. 611,382.

*To all whom it may concern:*

Be it known that I, JOHN HOWARD MC-CORMICK, a citizen of the United States, residing at New Orleans, in the parish of Orleans and State of Louisiana, have invented new and useful Improvements in Cotton-Seed Delinters, of which the following is a specification.

My present invention has to do with cotton seed delinters; and its general object is to provide a delinter that is simple, compact and durable in construction and is possessed of high efficiency.

The invention will be best understood by reference to the following description when taken in connection with the accompanying illustration of one specific embodiment thereof, while its scope will be more particularly pointed out in the appended claims.

In the drawings which are hereby made a part hereof: Figure 1 is a front elevation of my novel delinter. Fig. 2 is an elevation of one side thereof. Fig. 3 is an elevation of the opposite side. Fig. 4 is a plan. Fig. 5 is a vertical section taken in the plane indicated by the line 5—5 of Fig. 1, looking in the direction of the arrow, and showing the drum partly in elevation and partly in dotted lines. Fig. 6 is a detail view, partly in elevation and partly in vertical section and partly in dotted lines, of the drum of the delinter. Fig. 7 is a plan of the same. Fig. 8 is an inverted plan of said drum. Fig. 9 is an enlarged detail side elevation, and Fig. 10 a top view illustrative of one of the pairs of steel blades comprised in the drum, and the interposed flexible body, preferably of leather, by which the blades are carried, and through the medium of which the blades are connected to the drum. Fig. 11 is a detail horizontal section taken in the plane of line 10—10 on Fig. 5, looking downward.

Similar letters designate corresponding parts in all of the views of the drawings, referring to which: A is the casing or shell of the delinter, provided on its top $a$ with a hopper $b$ in which is a rotary drum $c$ for regulating and rendering steady the supply of cotton seed to the rotary brush drum B in the stationary foraminous cylinder C. Alongside the casing A is an upright air reservoir D, and leading from the said reservoir, at intervals in the height thereof, are air-supply conduits E which discharge into the casing A at different heights and at different points in the circumference thereof. The reservoir D is connected at its lower end to the casing F of a fan blower by which said reservoir is supplied with air under pressure, and the effect of supplying such air to the interior of the casing A at different points in the height and circumference thereof is to create a whirlwind in the casing and around the cylinder C, and thereby thoroughly agitate all of the lint in the chamber between the cylinder C and casing A, and preclude choking as well as to accelerate the passage of the lint to and through the discharge chutes G with which the casing A is equipped adjacent its lower end. I would also have it here understood that the supply of air under pressure to different points in the height and circumference of the casing A and the maintenance of the whirlwind in the space between the cylinder C and casing A are materially advantageous since thereby the cotton seed is kept cool during the delinting thereof.

For the purpose of enabling the operator of the apparatus to regulate the air supplied through the conduits E to the interior of the casing A, I provide the said conduits with valves $d$ which *per se* may be of conventional or any other suitable construction.

At its upper end the air reservoir D is provided with a relief valve D′, of conventional construction, which is designed as its name imports to open when the pressure in the reservoir reaches a predetermined point and permit air to escape therefrom.

The fan H of the blower mentioned is fixed on shaft I that bears a pulley $y^2$ and is driven as hereinafter described. The brush drum B and the cylinder C are tapered or gradually reduced in diameter downward, and at its upper end the cylinder is spaced from the casing by an annulus $e$, Fig. 5. At its lower end the casing A surrounds an annular flange $f$ on a bed plate J, while the cylinder C extends down through said bed plate and is provided below the same with an imperforate portion $g$. The bed plate J, in turn, is superposed on a suitable frame K, preferably of wood. The brush drum B comprises an upper head $k$, a lower head $l$, a trunnion $m$ suitably fixed to the head $k$ and journaled in the casing top $a$, a trunnion $n$ suitably fixed to the head $l$, staves $p$, preferably of wood, extending between and fixed to the heads $k$ and $l$, segments $r$, preferably of wood, arranged one above the other and surrounding and attached to the staves $p$ and having undercut grooves $s$ in their outer sides so that the groove of each segment with that of one adjoining segment forms a circumferential groove of dovetail form in cross-section, Fig. 6, and brushes S. The said brushes are identical in construction and therefore a detailed description of the one shown in Figs. 9 and 10 will suffice to impart a definite understanding of all. By reference to said figures it will be seen that the brush mentioned comprises blades $t$, of steel, having saw-teeth $u$ at their outer ends, and a flexible body $v$, of leather, interposed between the blades $t$ and connected thereto by copper rivets $w$ and having a rear dovetail-shaped extension $x$; the purpose in so attaching the steel blades to the leather body being to prevent crystallization taking place on the blades, and the leather body being also designed to render the connection of the blades to the drum more or less flexible, and in that way increase the efficiency of the blades.

The brushes S are arranged in upright position and in horizontal series on the drum, and by reference to Fig. 6 it will be manifest that a number of horizontal series of brushes, one above the other on the drum, are employed; also, that the brushes of each series are arranged side by side with the dovetail portions of their bodies secured in the dovetail grooves of the drum. From this latter it follows that a drum comprising the staves $p$, segments $r$ and brushes S may be expeditiously and easily built, and that the drum as a whole is strong and durable and is highly efficient in combination with the cylinder C in removing lint from the cotton seed. I would also have it here understood that the head $k$ of the brush drum is convex at its upper side and is provided on said side with projections $y$ which have for their office to scatter the seed received from the hopper $b$ and cause such seed to fall back, after the manner of rain, on the said convex side, after which the seed is again scattered and caused to pass singly down the convex side of the head to the upper end of the space between the perimeter of the drum B and the cylinder C. Obviously when the seeds are fed singly to the said space the drum B and cylinder C are enabled to operate upon the seed to much better advantage than would be the case were the seed supplied in a mass to the upper end of the said space between the brush drum and cylinder.

The lower end of the cylinder C is closed by a ring M suitably fixed within said end, in combination with a rotary ring N that is provided with vertical grooves R to receive feathers P on the depending portion of the drum head $l$, this in order to assure rotation of the said rotary ring N with the head $l$ and brush drum, while permitting of the brush drum being adjusted vertically without stopping the rotation thereof and the operation of the machine. Between the ring M and the ring N anti-friction balls S' are interposed in order to render easy the rotation of the latter ring, and on the perimeter of said ring N are blades T whereby said ring is enabled to perform its chief function, namely to throw seed from the lower end of the casing C outward through the seed discharge spout U.

For the purpose of affording adjustment of the brush drum B, I employ the means best shown at the lower end of Fig. 5. This means comprises a socket $a^2$ connected with the frame below the bed plate J, a flanged and interiorly threaded sleeve $b^2$ disposed in said socket, an exteriorly threaded bearing $c^2$ which receives the trunnion $n$ and is designed to be turned and raised or lowered in the sleeve $b^2$ to adjust the brush drum B, and a jam nut $d^2$ on the bearing $c^2$ for precluding casual movement thereof in sleeve $b^2$.

Communicating with the seed-discharge spout U is an uptake $e^2$ on which is a casing $f^2$ containing a dust box $g^2$, Fig. 1, and from the said casing $f^2$ a pipe $h^2$ extends to and communicates with the interior of the casing A, this in order to enable the suction in the casing to draw any lint that may be commingled with the seed in the discharge spout U back into the casing A. Any dust or analogous foreign matter that may be present in the seed as the same passes through the spout U will by the said suction be separated from the seed and drawn with the lint up into the casing $f^2$, and the dust will gravitate and remain in the dust box $g^2$.

$E^2$ is the primary drive-shaft of the machine, and $F^2$ is a miter gear feathered on the upper trunnion $m$ of the brush drum B so as not to interfere with the vertical adjustment of the said drum. With the said gear $F^2$ is intermeshed a miter gear $m'$ on a shaft $n^2$ which shaft is driven from the shaft $E^2$ through the medium of sprocket gears $p^2$ and $r^2$ on the shafts $E^2$ and $n^2$, respectively, and a sprocket belt $s^2$ connecting said gears $p^2$ and $r^2$. The before mentioned drum $c$ in hopper $b$ is fixed on a shaft $s^3$, and is driven by means of sprocket gears $t^2$ and $u^2$ on the shafts $n^2$ and $s^3$, respectively, and a sprocket belt $v^2$ connecting said gears $t^2$ and $u^2$. On the shaft $n^2$ is a band pulley $w^2$ which band pulley is connected by a band $x^2$ with pulley $y^2$ on the fan shaft I to rotate the latter.

In the practical operation of the machine, it will be understood that when the shaft $E^2$ is rotated and seed from a cotton gin is supplied to the hopper $b$, such seed will be fed by the drum $c$ into the cylinder C and upon the top of the brush drum B and by said top, as before described in detail, will be caused to scatter and then work its way down between the drum B and cylinder C. As the lint is removed from the cotton seed, the lint passes outward through the slots in cylinder C and into the air chamber between casing A and cylinder C, where it will be met by a strong wind and carried out through the chutes or spouts G. The cotton seed continues down between drum B and cylinder C until it drops in the path of the blades on the revolving ring N, when it will be thrown by said blades out through the spout U. In the event of lint and dirt being commingled with the seed that is discharged into the spout U, the lint will be drawn back into casing A and the dust will be deposited in the box $g^2$ in the manner before described in detail.

The cylinder C is preferably toothed, as indicated by $t^3$, and perforated, as indicated by $u^3$, see lower left hand part of Fig. 6, in much the same manner as the cylinder F disclosed in my Letters-Patent No. 636,164 of Oct. 31, 1899.

Having described my invention, what I claim and desire to secure by Letters-Patent, is:

1. In a cotton seed delinter, the combination of a casing having a seed inlet and a seed outlet and a tangentially-disposed lint-discharge chute and being otherwise imperforate, a foraminous cylinder arranged in said casing and separated by an intervening space therefrom, which space is in communication with the lint-discharge chute, a rotatable brush drum disposed in the foraminous cylinder, an upright air reservoir located alongside the casing, a fan blower casing communicating with said reservoir, a rotary fan in said casing, means for rotating said fan, and conduits leading from the said reservoir to different points in the height and circumference of the casing to supply air under pressure to the said space.

2. In a cotton seed delinter, the combination of a casing having a seed inlet and a seed outlet and a lint outlet, and being otherwise imperforate, a foraminous cylinder arranged in said casing and separated by an intervening space therefrom, which space is in communication with the lint outlet, a rotatable brush drum disposed in the foraminous cylinder, and means positioned to supply air under pressure to the said space between the casing and foraminous cylinder at different points in the height and circumference of the casing to cool the seed and discharge the lint through the said outlet of the casing.

3. In a cotton seed delinter, the combination of a casing having a seed outlet and a lint outlet, a foraminous cylinder arranged in said casing and separated by an intervening space therefrom, which space is in communication with the lint outlet, a seed discharge spout leading from said cylinder; the casing aside from the seed inlet, lint outlet and seed discharge spout being imperforate, a rotatable brush drum disposed in the foraminous cylinder, means for supplying air under pressure to the said space between the casing and foraminous cylinder, and a return conduit leading from the seed-discharge spout at an intermediate point thereof to the said intervening space.

4. In a cotton seed delinter, the combination of a casing having a seed inlet and a lint outlet, a foraminous cylinder arranged in said casing and separated by an intervening space therefrom, which space is in communication with the lint outlet, a seed discharge spout leading from said cylinder; the casing aside from the seed inlet, lint outlet and seed-discharge spout being imperforate, a rotatable brush drum disposed in the foraminous cylinder, means for supplying air under pressure to the said space between the casing and foraminous cylinder, a return conduit leading from the seed-discharge spout at an intermediate point thereof to the said intervening space, and a dust box communicating with and adapted to receive dust from said conduit.

5. In a cotton seed delinter, the combination of a casing, a cylinder arranged in said casing, a ring fixed in the lower portion of the cylinder, a seed-discharge spout leading from said lower portion of the cylinder, a rotary ring mounted on the fixed ring and having a radial blade, anti-friction means interposed between the two rings, a rotatable brush drum arranged in the cylinder and feathered in said rotary ring and having a lower trunnion and an upper trunnion; the latter extending loosely through the top of the casing, a gear feathered on said upper trunnion, and means for adjusting the brush drum vertically through the medium of the lower trunnion thereof.

In testimony whereof I have hereunto set my hand in presence of two subscribing witnesses.

JOHN HOWARD McCORMICK.

Witnesses:
 CHAS. I. DUCHAMP,
 V. DRISCOLL.